US009206019B2

(12) United States Patent
Miyoshi

(10) Patent No.: US 9,206,019 B2
(45) Date of Patent: Dec. 8, 2015

(54) WORKING VEHICLE

(71) Applicant: TADANO LTD., Takamatsu, Kagawa (JP)

(72) Inventor: Masato Miyoshi, Takamatsu (JP)

(73) Assignee: TADANO LTD., Kagawa (JP)

(*) Notice: Subject to any disclaimer, the term of this patent is extended or adjusted under 35 U.S.C. 154(b) by 0 days.

(21) Appl. No.: 13/935,890

(22) Filed: Jul. 5, 2013

(65) Prior Publication Data

US 2014/0019016 A1 Jan. 16, 2014

(30) Foreign Application Priority Data

Jul. 10, 2012 (JP) ................................ 2012-154972

(51) Int. Cl.

| | |
|---|---|
| ***G06F 7/00*** | (2006.01) |
| ***G06F 17/00*** | (2006.01) |
| ***G06G 7/00*** | (2006.01) |
| ***G06G 7/76*** | (2006.01) |
| ***B66C 13/18*** | (2006.01) |
| ***B66C 23/88*** | (2006.01) |
| ***B66C 23/90*** | (2006.01) |

(52) U.S. Cl.

CPC ................ *B66C 13/18* (2013.01); *B66C 23/88* (2013.01); *B66C 23/905* (2013.01)

(58) Field of Classification Search

None

See application file for complete search history.

(56) References Cited

U.S. PATENT DOCUMENTS 2,741,373 A * 4/1956 Edgar .......................... 212/302
2,763,218 A * 9/1956 Graham ...................... 104/126
3,641,551 A * 2/1972 Sterner et al. ................. 340/522
3,757,066 A * 9/1973 Sterner et al. ............... 200/82 R
4,178,591 A 12/1979 Geppert
4,690,246 A * 9/1987 Hornagold et al. ............ 182/2.3
5,501,656 A * 3/1996 Homma et al. ................. 601/33
7,165,619 B2 * 1/2007 Fox et al. ...................... 166/343
8,195,368 B1 * 6/2012 Leban et al. .................... 701/50
2003/0033772 A1 * 2/2003 Russell .......................... 52/292

(Continued)

FOREIGN PATENT DOCUMENTS

GB 1 107 116 3/1968
JP U-02-066589 5/1990

(Continued)

OTHER PUBLICATIONS

European Search Report issued in Application No. 13175041.6; Dated Oct. 11, 2013.

(Continued)

*Primary Examiner* — John R Olszewski
*Assistant Examiner* — Tommy Worden
(74) *Attorney, Agent, or Firm* — Oliff PLC

(57) ABSTRACT

A working vehicle configured to raise and lower one of a jib and a boom by using a wire rope wound around a winch, the working vehicle includes: a detection part provided on one of the jib and the boom and configured to detect an angle of one of the jib and the boom controlled to be raised and lowered to determine whether or not an overload detection condition occurs or to perform overload prevention control; an acquisition part configured to acquire the angle of one of the jib and the boom controlled to be raised and lowered, based on a feed length of the wire rope; and a determination part configured to determine that a failure occurs when a difference between the angle detected by the detection part and the angle acquired by the acquisition part exceeds a predetermined tolerance.

9 Claims, 5 Drawing Sheets

(56) References Cited

U.S. PATENT DOCUMENTS

| | | | | |
|---|---|---|---|---|
| 2003/0067188 | A1* | 4/2003 | Go | 296/146.11 |
| 2003/0178200 | A1* | 9/2003 | Fox et al. | 166/341 |
| 2006/0131096 | A1* | 6/2006 | Ono et al. | 180/400 |
| 2008/0100977 | A1* | 5/2008 | Shreiner et al. | 361/91.1 |
| 2008/0203046 | A1* | 8/2008 | Friesen et al. | 212/274 |
| 2008/0238180 | A1* | 10/2008 | Kraenzle | 298/11 |
| 2009/0173566 | A1* | 7/2009 | Ogasawara | 180/446 |
| 2010/0049391 | A1* | 2/2010 | Nakano | 701/23 |
| 2012/0241404 | A1* | 9/2012 | Bobeck | 212/300 |
| 2013/0062301 | A1 | 3/2013 | Wagner | |
| 2013/0253759 | A1* | 9/2013 | Matsumoto | 701/31.1 |
| 2013/0311011 | A1* | 11/2013 | Malta | 701/3 |
| 2014/0019016 | A1* | 1/2014 | Miyoshi | 701/50 |

FOREIGN PATENT DOCUMENTS

| | | | |
|---|---|---|---|
| JP | 2001-146385 | A | 5/2001 |
| WO | WO 80/00076 | A1 | 1/1980 |
| WO | WO 2011/101133 | A1 | 8/2011 |
| WO | WO 2012/084508 | A2 | 6/2012 |

OTHER PUBLICATIONS

Jul. 28, 2015 Office Action issued in European Patent Application No. 13175041.6.

* cited by examiner

WORKING VEHICLE

CROSS-REFERENCES TO RELATED APPLICATIONS

This application claims the benefit of Japanese Patent Application No. 2012-154972, filed Jul. 10, 2012, which is incorporated herein by reference.

BACKGROUND

1. Technical Field

The present invention relates to a working vehicle such as a crane vehicle.

2. Related Art

The body of a working vehicle is placed in the working position. The body of the working vehicle is stabilized by using, for example, outriggers. The jib or the boom of the working vehicle is raised or lowered by winding up or down a wire rope with a winch. The working vehicle may be in an overload condition depending on the length and the angle of the jib or the boom controlled to be raised and lowered, and on the weight of the goods suspending from the jib or the boom. This causes a decrease in stability of the working vehicle. The working vehicle is therefore required to detect the angle of the jib or the boom controlled to be raised and lowered, as disclosed in, for example, Utility model Literature 1.

Utility model Literature 1: Japanese Utility Model Application Laid-Open No. HEI02-066589

However, a detection part configured to detect the angle of the jib or the boom controlled to be raised and lowered is provided, for example, in the front end portion of the jib as disclosed in Utility model Literature 1. The detection part provided in the front end portion is exposed to the outside, and therefore is susceptible to the weather such as rain. If the detection part fails, it is not possible to accurately detect the angle of the jib or the boom controlled to be raised and lowered.

Thus, working vehicles are required to be able to determine whether or not a failure has occurred.

SUMMARY

According to an aspect of the present invention, a working vehicle configured to raise and lower one of a jib and a boom by using a wire rope wound around a winch includes: a detection part provided on one of the jib and the boom and configured to detect an angle of one of the jib and the boom controlled to be raised and lowered to determine whether or not an overload detection condition occurs or to perform overload prevention control; an acquisition part configured to acquire the angle of one of the jib and the boom controlled to be raised and lowered, based on a feed length of the wire rope; and a determination part configured to determine that a failure occurs when a difference between the angle detected by the detection part and the angle acquired by the acquisition part exceeds a predetermined tolerance.

It is preferred that the working vehicle according to claim 1, further includes a control part configured to issue a warning and stops the winch when the determination part determines that the failure occurs.

It is preferred that the control part stops the winch, when the determination part determines that the failure occurs and the angle detected by the detection part is out of a predetermined angular range; and the control part, after the stop of the winch, does not employ the angle detected by the detection part but employs the angle acquired by the acquisition part in order to determine whether or not the overload detection condition occurs or to perform overload prevention control.

It is preferred that the detection part is disposed on the jib, the jib being detachably attached to the boom, and configured to detect the angle of the jib controlled to be raised and lowered with respect to the boom.

According to the present invention, the determination part compares between the angle of the jib or the boom detected by the detection part, the detection part being provided on the jib or the boom, and the angle of the jib or the boom acquired based on the feed length of the wire rope wound around the winch. If the difference between the detected angle and the acquired angle increases, the determination part determines that a failure occurs. The determination part can determine whether or not the detection part or the acquisition part fails.

DESCRIPTION OF EXEMPLARY EMBODIMENTS

In the following, a working vehicle according to embodiments of the present invention will be described with reference to the drawings.

<Embodiment 1>

Figure 1:
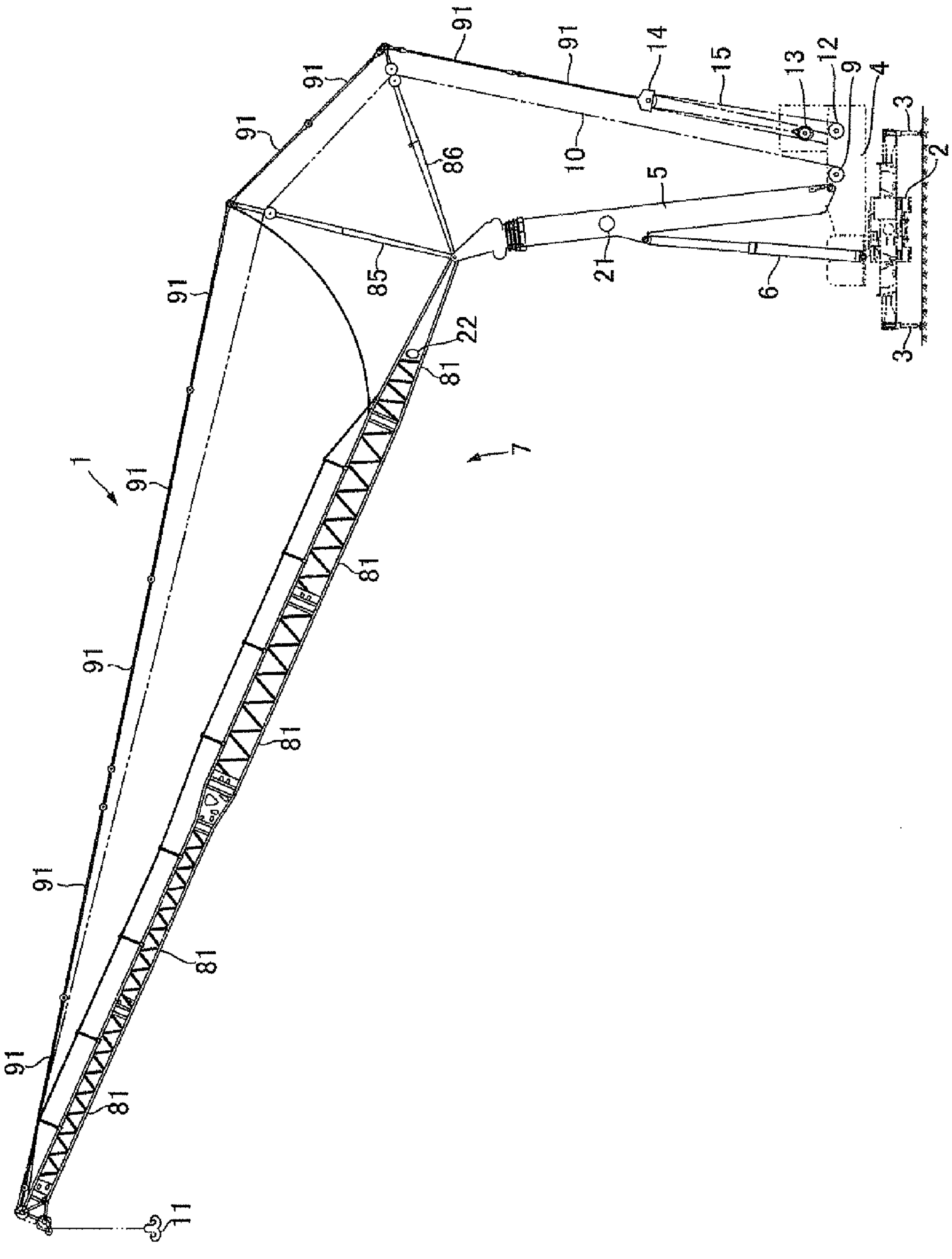
FIG. 1 is a drawing showing the entire structure of a crane working vehicle according to Embodiment 1 of the present invention.

FIG. 1 is a drawing showing the entire structure of a crane working vehicle 1 according to Embodiment 1 of the present invention.

The crane working vehicle 1 shown in FIG. 1 has outriggers 3 provided on the right and left sides of a vehicle body 2. The outriggers 3 can extend and retract in the right to left side direction of the vehicle body 2 and can fix the vehicle body 2 in a jacked-up state from the ground. A swivel part 4 is pivotably provided on the loading platform of the vehicle body 2. The swivel part 4 is provided with, for example, a telescopic boom 5, a boom cylinder 6, a crane winch 9, a jib winch 12 and a fixed sheave 13, which constitute a crane mechanism. The telescopic boom 5 is constituted by a plurality of boom parts which are coupled with each other to be able to extend and retract. One end of the telescopic boom 5 is provided on the swivel part 4 such that the telescopic boom 5 can be raised and lowered. The boom cylinder 6 is provided between the telescopic boom 5 and the swivel part 4. The boom cylinder 6 may be extended and retracted by hydraulic pressure. When the boom cylinder 6 extends, the telescopic boom 5 is raised. FIG. 1 shows a working posture state in which the telescopic boom 5 is raised. When the boom cylinder 6 retracts, the telescopic boom 5 is lowered. In this way, the telescopic boom 5 is elevated and depressed.

A luffing jib 7, a first mast 85 and a second mast 86 are detachably attached to the front end of the telescopic boom 5. The luffing jib 7 is formed by coupling a plurality of divided jib parts 81. The front end of the luffing jib 7 is connected to a floating sheave 14 in the air with a plurality of tension rods 91. The plurality of tension rods 91 are supported by the first mast 85 and the second mast 86. A jib wire rope 15 to be wound around the jib winch 12 spans between the floating sheave 14 and the fixed sheave 13. These members are assembled and attached to the front end of the telescopic boom 5 at a work site. The members attached to the front end of the telescopic boom 5 may be removed from the front end of the telescopic boom 5 and taken apart at a work site.

The jib wire rope 15 is paid out from the jib winch 12 to move the floating sheave 14, for example, up in FIG. 1, so that the luffing jib 7 is depressed against the telescopic boom 5.

Meanwhile, the jib wire rope 15 is wound up around the jib winch 12 to move the floating sheave 14 down in FIG. 1, for example, and therefore it is possible to elevate the luffing jib 7 from the telescopic boom 5.

In this way, the luffing jib 7 is elevated and depressed.

The crane winch 9 winds the crane wire rope 10. The crane wire rope 10 is guided with the roller of the second mast 86 and the roller of the first mast 85 and suspends from the front roller of the luffing jib 7. A work tool 11 such as a crane member is fixed to the front end of the crane wire rope 10. The crane winch 9 pays out or winds the crane wire rope 10, and therefore the work tool 11 moves up and down in FIG. 1. Thus, the goods suspending from the work tool 11 can be moved up and down.

During the work, the crane working vehicle 1 is subject to a moment according to the weight and so forth of the goods suspending from the working tool 11. For example, when the luffing jib 7 is raised and the telescopic boom 5 is extended, a large rotation moment is applied to the crane working vehicle 1 even if the suspending goods are not very heavy. The crane working vehicle 1 may be in an overload condition, depending on the lengths and the angles of the telescopic boom 5 and the luffing jib 7 and the weight of the suspended goods, and thereby reducing the stability of the crane working vehicle 1.

In order to improve the stability of the crane working vehicle 1, the vehicle body 2 of the crane working vehicle 1 is placed in the working position by using the outriggers 3, for example.

It is preferred that the crane working vehicle 1 performs automatic stop control to prevent an overload condition, monitoring the lengths and the angles of the telescopic boom 5 and luffing jib 7. The crane working vehicle 1 shown in FIG. 1 includes a boom angle detection part 21 configured to directly detect the angle of the telescopic boom 5 controlled to be raised and lowered, and a jib angle detection part 22 configured to directly detect the angle of the luffing jib 7 controlled to be raised and lowered.

Figure 2:
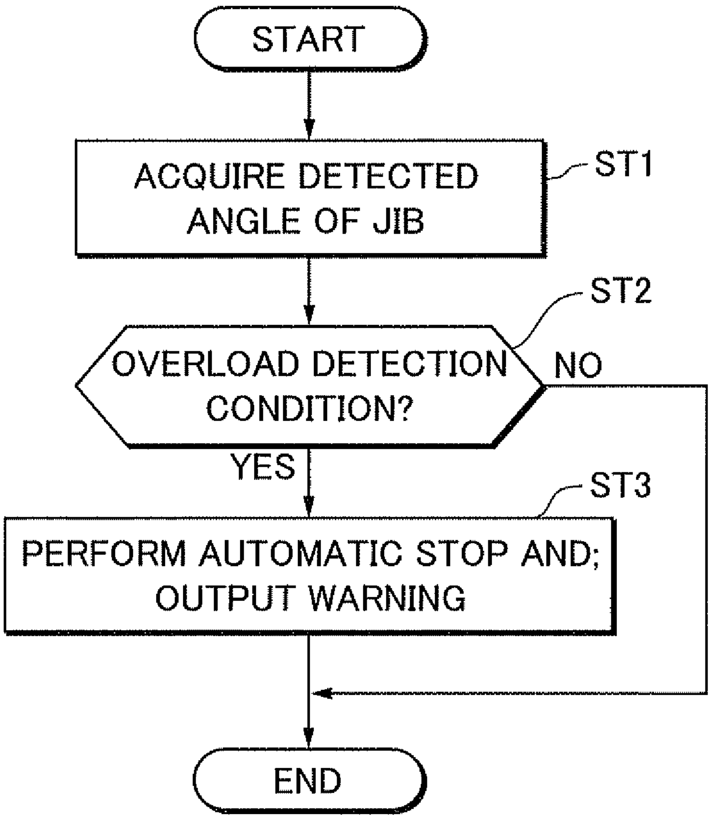
FIG. 2 is a flowchart showing overload prevention control based on the angle of the luffing jib shown in FIG. 1.

FIG. 2 is a flowchart showing overload prevention control based on the angle of the luffing jib 7.

A main control part 54 of an overload prevention device 24 described later repeatedly checks if the crane working vehicle 1 is not in an overload condition. To be more specific, the main control part 54 monitors the angle of the luffing jib 7 controlled to be raised and lowered and repeatedly performs overload prevention control shown in FIG. 2 on a periodic basis.

The main control part 54 acquires the angle of the luffing jib 7 detected by the jib angle detection part 22 (step ST1).

Next, the main control part 54 checks if an overload detection conditionoverload detection condition occurs by using the detected angle of the luffing jib 7 (step ST2). For example, at first, the main control part 54 acquires the length, angle and swivel angle of the telescopic boom 5, and the length and angle of the luffing jib 7. Then, the main control part 54 acquires the rated value of the total moment for those values. The rated value is used for detecting a condition before the overload condition occurs. Next, the main control part 54 acquires an actual moment signal based on the detection and compares the signal with the rated value of the total moment. Then, when determining that the moment signal based on the detection is equal to or greater than the rated value, the main control part 54 determines that an overload detection conditionoverload detection condition occurs. If the moment signal is smaller than the rated value, the main control part 54 determines that an overload detection conditionoverload detection condition does not occur.

When determining that an overload detection condition-overload detection condition occurs, the main control part 54 automatically stops the operation of the crane working vehicle 1. For example, the main control part 54 stops the jib winch 12. In addition, the main control part 54 outputs a warning from a warning part 26 described later (step ST3).

By this means, the angle of the luffing jib 7 controlled to be raised and lowered is automatically controlled to remain within a predetermined range to avoid reaching the angle limit. If the angle of the luffing jib 7 reaches the detecting limit, the jib winch 12 is automatically stopped and a warning is issued, and therefore the user can notice that the crane working vehicle 1 is about to be in an overload condition. By this means, an overload condition is not likely to occur, which is caused by that the angle of the luffing jib 7 controlled to be raised and lowered exceeds the detecting limit.

Here, among these detection parts to prevent an overload condition from occurring, for example, the jib angle detection part 22 is provided on the base end of the luffing jib 7 and exposed to the outside. The jib angle detection part 22 is placed in an outdoor location with the luffing jib 7 when not in use, and therefore is susceptible to the weather such as rain. Rain water may enter the jib angle detection part 22 or its connectors 34. If the jib angle detection part 22 fails, or the connectors 34 get rusted, the jib angle detection part 22 cannot accurately detect the angle of the luffing jib 7 controlled to be raised and lowered.

Therefore, with the present embodiment, it is indirectly determined whether or not the jib angle detection part 22 fails and whether or not the connectors 34 are rusted. In a situation in which those problems may occur, the control is automatically stopped and a warning is issued.

Figure 3:
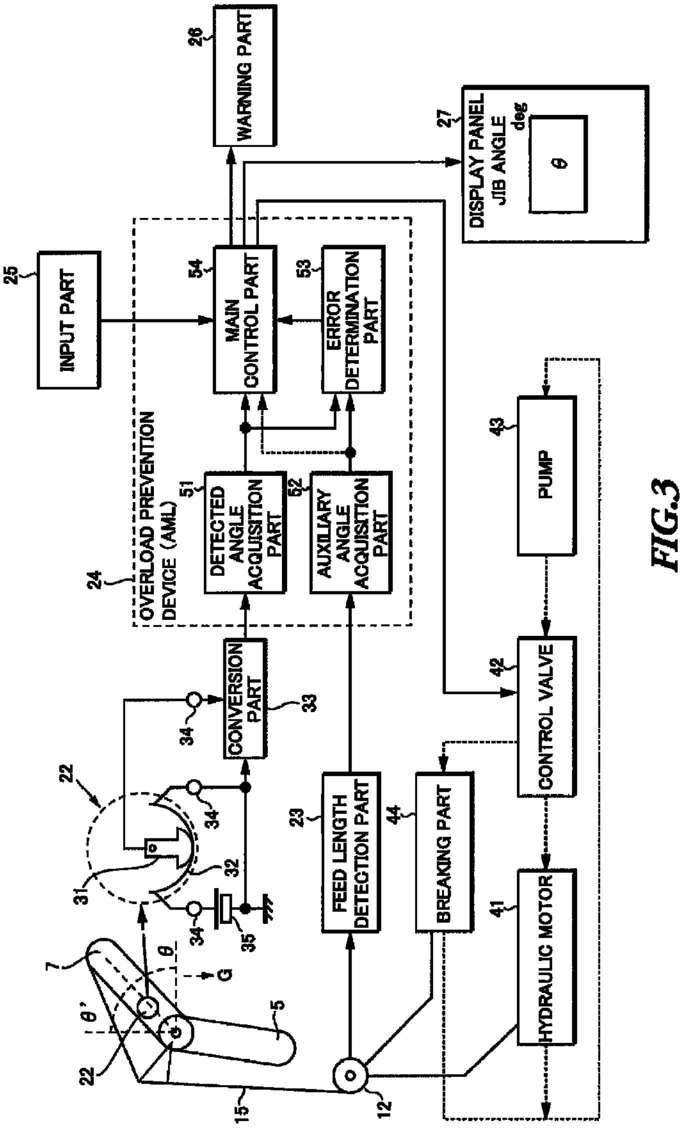
FIG. 3 is a drawing explaining a control system that detects a failure of the jib angle detection part shown in FIG. 1.

FIG. 3 is a drawing explaining a control system that detects a failure of the jib angle detection part 22.

As shown in FIG. 3, the jib angle detection part 22 provided on the luffing jib 7 includes a conductive rotating weight 31 and an arc-like resistance plate 32 contacting this rotating weight 31. The rotating weight 31 is stable in vertical direction regardless of the angle of the luffing jib 7 controlled to be raised and lowered. Therefore, the position at which the rotating weight 31 contacts the resistance plate 32 varies according to the angle of the luffing jib 7 controlled to be raised and lowered. The jib angle detection part 22 mechanically detects the angle of the luffing jib 7 controlled to be raised and lowered with respect to the telescopic boom 5.

The angle of the luffing jib 7, which is detected by the jib angle detection part 22 shown in FIG. 3, is, for example, angle $\theta$ in horizontal direction. Besides this, the jib angle detection part 22 may detect angle $\theta'$ in vertical direction. The jib angle detection part 22 may detect an angle in the length direction of the telescopic boom 5.

The luffing jib 7 can be detached from the telescopic boom 5. The jib angle detection part 22 is connected to a conversion part 33 through the connectors 34. The conversion part 33 is connected to one end of the resistance plate 32 and to the rotating weight 31. The jib angle detection part 22 outputs, to the conversion part 33, the voltage which is obtained by dividing the voltage of a direct current power supply 35 applied to both ends of the resistance plate 32, according to the division ratio of the resistance plate 32 at the contact location of the rotating weight 31. The direct current power supply 35 may be a battery.

In a case in which the jib angle detection part 22 is separated from the conversion part 33 in the control system shown in FIG. 3, the wiring of the connectors 34 is exposed. The wiring is therefore prone to oxidize and get rusted. In addition, rain water may enter from the connecters 34 into the jib angle detection part 22 through the wiring.

The jib winch 12 is driven to rotate by a hydraulic motor 41. The hydraulic motor 41 is connected to a hydraulic system including a pump 43 and a control valve 42. When the control valve 42 opens, the pressurized oil by the pump 43 flows into the hydraulic motor 41. As a result, the hydraulic motor 41 rotates. The discharged oil from the hydraulic motor 41 returns to the pump 43.

The jib winch 12 is provided with a breaking part 44. The breaking part 44 is connected to the control valve 42. When the pressurized oil is supplied through the control valve 42, for example, a break shoe of the breaking part 44 activates, and therefore the jib winch 12 stops from rotating.

To secure the lifting height for the goods suspending from the work tool 11, a feed length detection part 23 is connected to the jib winch 12. The feed length detection part 23 detects an amount of the rotation of the jib winch 12 on the basis of the state of the jib winch in which, for example, the jib wire rope 15 is stored on the jib winch 12. The length of the jib wire rope 15, which is paid out from the jib winch 12, can be calculated based on the detected amount of the rotation. The feed length detection part 23 is generally provided in the crane working vehicle 1 in order to, for example, detect the height of the position of the work tool 11 or the suspended goods.

The control system for overload prevention shown in FIG. 3 includes the detection parts 22 and 23 described above, an overload prevention device 24, an input part 25, the warning part 26 and a display panel 27.

The input part 25 includes, for example, a lever and an input panel that are operated by the user. The input part 25 is disposed in an operation room in the swivel part 4. The input part 25 outputs a signal according to the operation.

The warning part 26 may be, for example, a warning buzzer emitting a sound or a warning lamp emitting light.

The display panel 27 may be a panel displaying the operation state of the crane working vehicle 1. The display panel 27 shown in FIG. 3 can display the angle of the luffing jib 7 controlled to be raised and lowered.

The overload prevention device 24 is connected to the conversion part 33, the feed length detection part 23, the input part 25, the control valve 42, the warning part 26, and the display panel 27.

The overload prevention device 24 may be, for example, a microcomputer. The CPU of the microcomputer executes programs stored in the memory of the microcomputer. By this means, a detected angle acquisition part 51, an auxiliary angle acquisition part 52, an error determination part 53 and the main control part 54 are realized in the overload prevention device 24.

The main control part 54 determines whether or not the crane working vehicle 1 is in an overload detection condition. Then, if the crane working vehicle 1 is in an overload detection condition, the main control part 54 performs overload prevention control.

Figure 4:
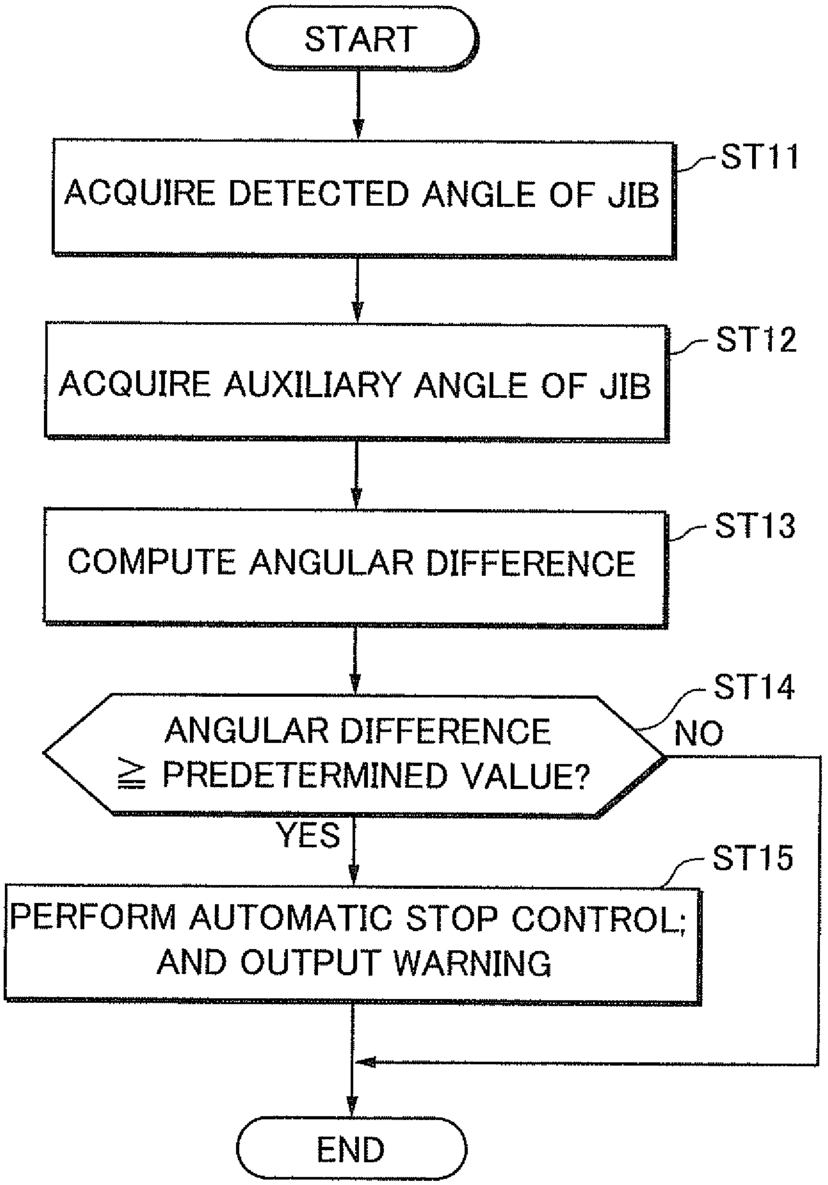
FIG. 4 is a flowchart showing processing by the control system shown in FIG. 3 to detect a failure of the jib angle detection part.

FIG. 4 is a flowchart showing processing to detect a failure of the jib angle detection part 22.

The overload prevention device 24 repeatedly performs the processing shown in FIG. 4.

In the processing shown in FIG. 4 to detect a failure of the jib angle detection part 22, the detected angle acquisition part 51 acquires the angle of the luffing jib 7, which is directly detected by the jib angle detection part 22 (step ST 11).

The detected angle acquisition part 51 acquires the detected angle of the luffing jib 7, which corresponds to the detection voltage inputted from the conversion part 33, by means of, for example, calculation. The detected angle acquisition part 51 may acquire the detected angle of the luffing jib 7 based on a table in which the detection voltages are associated with the angles of the luffing jib 7 in advance. The table may be stored in the memory of the microcomputer.

Next, the auxiliary angle acquisition part 52 acquires the auxiliary angle of the luffing jib 7 (step ST12).

The auxiliary angle acquisition part 52 acquires the auxiliary angle of the luffing jib 7 based on the feed length of the jib wire rope 15. The auxiliary angle acquisition part 52 acquires the auxiliary angle of the luffing jib 7 that corresponds to the feed length of the jib wire rope 15 inputted from the feed length detection part 23, based on the table in which, for example, the feed lengths of the jib wire rope 15 are associated with the angles of the luffing jib 7 in advance. The table may be stored in the memory of the microcomputer. The auxiliary angle acquisition part 52 may acquire the auxiliary angle of the luffing jib 7 by means of calculation using a computing equation with an argument which is the feed length of the jib wire rope 15. Moreover, the auxiliary angle acquisition part 52 may acquire the accurate auxiliary angle of the luffing jib 7 by means of calculation using a computing equation with arguments which are the length and the angle of the telescopic boom 5, as well as the feed length of the jib wire rope 15. Here, the jib wire rope 15 is made by twisting metallic wires and may have the length of several hundred meters. The length of the jib wire rope 15 may change according to environments of usage, such as temperature. The angle of the luffing jib 7 acquired based on the feed length of the jib wire rope 15 may include a greater detection error than when the angle of the luffing jib 7 is directly detected. Therefore, the auxiliary angle of the luffing jib 7 acquired by the auxiliary angle acquisition part 52, based on the feed length of the jib wire rope 15, is not employed for overload prevention control in general operation. The angle of the luffing jib 7 based on the feed length is employed supplementarily to detect a failure of the jib angle detection part 22. As a result, with the present embodiment, it is possible to detect a failure of the jib angle detection part 22 without affecting overload prevention control in general operation.

However, the auxiliary angle acquired by the auxiliary angle acquisition part 52 may be used for overload prevention control in general operation. If the auxiliary angle acquired by the auxiliary angle acquisition part 52 is employed, it is preferred to lower the operating limit value for making a decision that an overload detection condition occurs based on the angle of the luffing jib 7, taking into account the above-described detection error. Here, when the operating limit value for making the decision is lowered, the operation performance of the crane working vehicle 1 might be reduced.

Next, the error determination part 53 computes the difference between the detected angle of the luffing jib 7 acquired by the detected angle acquisition part 51 and the auxiliary angle of the luffing jib 7 acquired by the auxiliary angle acquisition part 52 (step ST13). The error determination part 53 detects a failure of the jib angle detection part 22 based on the calculated angular difference (step ST14).

When the angular difference exceeds a predetermined value the error determination part 53 determines that the jib angle detection part 22 or the feed length detection part 23 fails. The error detection part 53 outputs, for example, a failure detection signal.

When the angular difference is equal to or smaller than a predetermined value, the error determination part 53 determines that the jib angle detection part 22 does not fail. In this case, the error determination part 53 does not output an error detection signal.

When the angular difference is equal to or smaller than a predetermined value, the main control part 54 performs overload prevention control (step ST15).

For example, upon receiving a failure detection signal from the error determination part 53, the main control part 54 outputs a control signal to the control valve 42. The control of the telescopic boom 5 and the luffing jib 7 is thereby automatically stopped. Then, the error determination part 53 outputs a warning signal to the warning part 26.

In the automatic stop processing, the control valve 42 stops supplying oil to, for example, the hydraulic motor 41. Then, the pressurized oil is supplied to the breaking part 44. Then, the jib winch 12 is stopped, so that the luffing jib 7 which is being raised or lowered 7 is stopped.

In warning processing, the warning part 26 issues a warning. By this means, the user can know that the jib angle detection part 22 is likely to fail. In a working situation where the angle of the luffing jib 7 is not beyond the limit of the control, the luffing jib 7 is forcibly stopped. By checking the stopped state thereof, the user can distinguish between the warning whether it caused by the failure detection or it caused by the excessing of the limit.

As described above, in the overload prevention device 24 according to the present embodiment, the jib angle detection part 22 detects the angle of the luffing jib 7 and the auxiliary angle acquisition part 52 acquires the auxiliary angle of the luffing jib 7 based on the feed length of the jib wire rope 15 wound around the jib winch 12, and then the detected angle and the auxiliary angle are compared. When the result of the comparison of the angular difference is equal to or greater than a predetermined value, the overload prevention device 24 determines that the jib angle detection part 22 or the feed length detection part 23 fails. Then, the overload prevention device 24 stops the jib winch 12 and issues a warning.

As a result, when the jib angle detection part 22 fails or the connectors 34 get rusted, the overload prevention device 24 can detect these problems, for example. Therefore, the overload prevention device 24 can prevent the crane work from being carried on continuously, by using the inaccurate angle of the luffing jib 7 detected by the failed jib angle detection part 22. Also, it is possible to call the user's attention to the failure.

In particular, with the present embodiment, the jib angle detection part 22 is disposed on the luffing jib 7 which is removably connected to the front end of the telescopic boom 5. The jib angle detection part 22 may be left in the rain, for example, with the removed luffing jib 7. In this way, a detection part is exposed to the outside and is more likely to fail than a detection part that is stored for example, in the swivel part 4.

With the present embodiment, it is possible to detect a failure of the detection part prone to fail, without adding a new detection part.

<Embodiment 2>

Next, the crane working vehicle 1 according to Embodiment 2 of the present invention will be described. The entire structure and the control system of the crane working vehicle 1 according to Embodiment 2 is the same as in Embodiment 1, and therefore the common component names and reference numerals are used, and repeated descriptions will be omitted.

The main control part 54 receives the auxiliary angle of the luffing jib 7 shown by the dotted line in FIG. 3, which is acquired by the auxiliary angle acquisition part 52, as well as the detected angle of the luffing jib 7 which is acquired by the detected angle acquisition part 51. The main control part 54 performs overload prevention control based on the angle of the luffing jib 7 shown in FIG. 5, instead of the control shown in FIG. 2.

Figure 5:
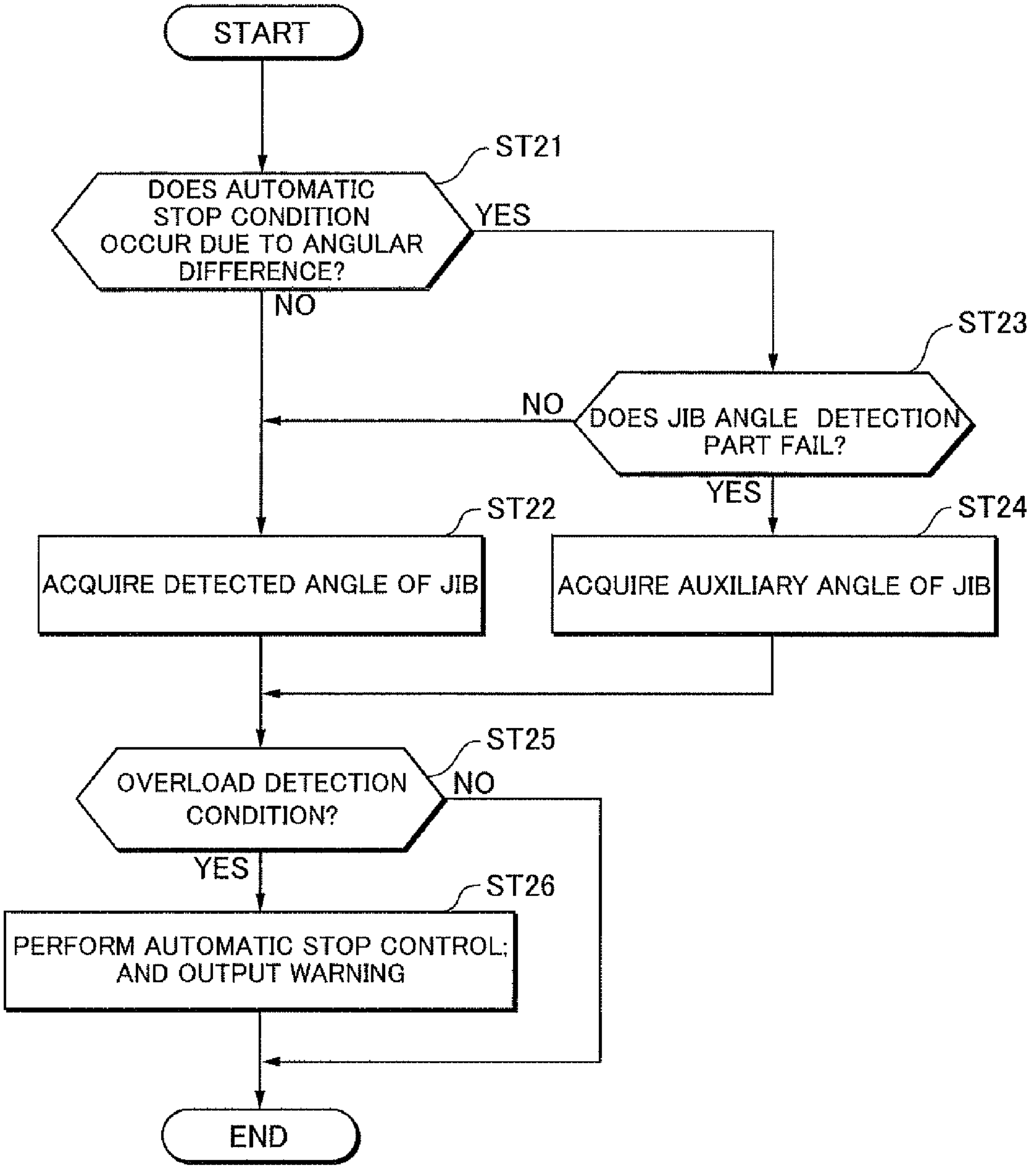
FIG. 5 is a flowchart showing overload prevention control based on the angle of the luffing jib according to Embodiment 2.

FIG. 5 is a flowchart showing overload prevention control based on the angle of the luffing jib 7 according to Embodiment 2.

The main control part 54 monitors the angle of the luffing jib 7 controlled to be raised and lowered. The main control part 54 repeatedly performs the automatic stop processing shown in FIG. 5 on a periodic basis.

In the overload prevention processing shown in FIG. 5, the main control part 54 determines whether or not the operation of the crane working vehicle 1 is automatically stopped due to the angular error determined in the processing shown in FIG. 4 (step ST21).

When the operation of the crane working vehicle 1 is not automatically stopped due to the angular error, the main control part 54 acquires the angle of the luffing jib 7 directly detected by the jib angle detection part 22 as usual (step ST22).

On the other hand, when the crane working vehicle 1 is automatically stopped due to the angular error, the main control part 54 checks if the jib angle detection part 22 fails (step ST23).

The main control part 54 determines whether or not the angle detected by the jib angle detection part 22 is out of a predetermined range used in usual control. For example, the main control part 54 determines whether or not the detected angle corresponds to 0V during a ground fault or 5V which is the voltage of the direct current power supply 35 during a voltage source fault. The main control part 54 may directly detect the input voltage of the conversion part 33.

When the angle corresponding to the ground fault or the voltage source fault is detected from the jib angle detection part 22, the jib angle detection part 22 is highly likely to fail. The main control part 54 does not acquire the angle of the luffing jib 7 detected by the jib angle detection part 22, but acquires the auxiliary angle of the luffing jib 7 acquired by the auxiliary angle acquisition part 52.

The auxiliary angle acquisition part 52 acquires the angle of the luffing jib 7 controlled to be raised and lowered, by referring such as a table corresponding to the feed length of the jib wire rope 15, but not by using the value detected by the jib angle detection part 22.

After the angle of the luffing jib 7 controlled to be raised and lowered is acquired, the main control part 54 determines whether or not an overload detection condition occurs by using the acquired angle of the luffing jib 7 (step ST25). The main control part 54 first acquires, for example, the length, the angle and the swivel angle of the telescopic boom 5, and also the length and the angle of the luffing jib 7. Then, the main control part 54 acquires the rated value of the total moment corresponding to these lengths and angles. Next, the main control part 54 acquires a moment signal based on the detection, and compares between the signal and the rated value of the total moment. When the moment signal based on the detection is equal to or greater than the rated value of the total moment, the main control part 54 determines that an overload detection condition occurs.

Then, the main control part 54 automatically stops the control and outputs a warning (step ST26). The main control part 54 outputs a control signal to the control valve 42, and activates the breaking part 44 to stop the hydraulic motor 41. Thereby the jib winch 12 automatically stops. Moreover, the main control part 54 allows the warning part 26 to output a warning.

Here, in step ST23 of FIG. 5, when determining that the jib angle detection part 22 does not detect the angle corresponding to such as a ground fault or a voltage source fault, the main control part 54 acquires the angle of the luffing jib 7 directly detected by the jib angle detection part 22 (step ST22) and continues the control.

Besides this, when determining that the jib angle detection part 22 does not detect the angle corresponding to a ground fault or a voltage source fault in step ST23, the main control part 54 may perform the stop processing and the warning output processing in step ST 26.

As described above, after the control is automatically stopped, the overload prevention device 24 according to the present embodiment checks if the jib angle detection part 22 fails. When it is determined that the jib angle detection part 22 fails, the overload prevention device 24 stops the jib winch 12. Moreover, in order to determine whether or not an overload detection condition occurs or to perform overload prevention control after the winch 12 is stopped, the overload prevention device 24 employs the auxiliary angle acquired based on the feed length of the jib wire rope 15 wound around the jib winch 12, instead of the angle detected by the jib angle detection part 22. In the processing to determine whether or not an overload detection condition occurs based on the angle of the luffing jib 7 controlled to be raised and lowered, the auxiliary angle acquired based on the feed length of the jib wire rope 15 is employed.

Therefore, even if the jib angle detection part 22 fails, the overload prevention device 24 can determine whether or not an overload detection condition occurs based on the angle of the luffing jib 7 controlled to be raised and lowered, by using the auxiliary angle that is more reliable than the value detected by the failed jib angle detection part 22. The overload prevention device 24 can control the luffing jib 7 and the telescopic boom 5, to prevent the angle of the luffing jib 7 controlled to be raised and lowered from placing the working crane vehicle 1 in an overload condition.

As a result, when it is determined that the jib angle detection part 22 fails during the operation such as extending or raising the telescopic boom 5 and the luffing jib 7, the overload prevention device 24 performs control operation to prevent the telescopic boom 5 and the luffing jib 7 from placing the working crane vehicle 1 in an overload condition, for example. While the jib angle detection part 22 fails, it is possible to lower the telescopic boom 5 and the luffing jib 7 to the ground. The user therefore can replace the jib angle detection part 22 of the luffing jib 7 on the ground in safety. On the other hand, when it is determined that the jib angle detection part 22 fails during the operation, the telescopic boom 5 and the luffing jib 7 may be stopped in this situation, for example. the jib angle detection part 22 fixed on the luffing jib 7 is being placed in the air. The user therefore has to replace the jib angle detection part 22 in the air.

Although the preferred embodiment has been explained, it is by no means limiting, it will be appreciated that various modifications and alterations are possible without departing from the scope of the invention.

For example, the overload prevention device 24 according to the above-described embodiments determines whether or not the jib angle detection part 22 configured to detect the angle of the luffing jib 7 controlled to be raised and lowered fails; automatically stops the control of the crane working vehicle 1; and issues a warning.

Besides this, the overload prevention device 24 may determine whether or not the boom angle detection part 21 configured to detect the angle of the telescopic boom 5 controlled to be raised and lowered fails; automatically stop the control of the crane working vehicle 1; and issue a warning, for example. If the crane working vehicle 1 employs a sectional lattice boom instead of the telescopic boom 5, and raises and lowers the lattice boom by using a wire rope, the boom angle detection part 21 configured to detect the angle of the lattice boom controlled to be raised and lowered is provided on the lattice boom and may be exposed to the outside.

With the above-described Embodiment 1, the angle of the luffing jib 7 detected by the jib angle detection part 22 is employed but the auxiliary angle is not employed, in the overload prevention control based on the angle of the luffing jib 7 controlled to be raised and lowered. Meanwhile, with the above-described Embodiment 2, when the jib angle detection part 22 fails and the operation of the crane working vehicle 1 is automatically stopped, the angle of the luffing jib 7 based on the feed length of the jib wire rope 15 is employed.

Moreover, the angle of the luffing jib 7 based on the feed length of the jib wire rope 15 may be employed, in the overload prevention control based on the angle of the luffing jib 7 shown in FIG. 2. In this case, the jib angle detection part 22 is not needed.

The invention claimed is:

1. A working vehicle, comprising:

a boom provided on the working vehicle;

a detachable jib being detachably attached to the boom;

a winch where a wire rope being wound around and configured to raise and lower the detachable jib attached to the boom by using the wire rope;

a detachable detection part provided on the detachable jib, configured to detach from the boom together with the detachable jib, having a conductive rotating weight and an arc-like resistance plate contacting with the conductive rotating weight at a varying location in accordance to an angle of the detachable jib, and configured to output a divided voltage of the resistance plate according to a contact location of the conductive rotating weight as a detected angle of the detachable jib for determining whether or not an overload detection condition occurs or to perform overload prevention control;

an acquisition part configured to acquire the angle of the detachable jib based on a feed length of the wire rope from the winch; and a determination part configured to determine that a failure occurs when a difference between the angle detected by the detachable detection part and the angle acquired by the acquisition part exceeds a predetermined tolerance.

2. A working vehicle, comprising:

a boom provided on the working vehicle;

a detachable jib being detachably attached to the boom;

a winch where a wire rope being wound around and configured to raise and lower the detachable jib attached to the boom by using the wire rope;

a detachable detection part provided on the detachable jib, configured to detach from the boom together with the detachable jib, having a conductive rotating weight and an arc-like resistance plate contacting with the conductive rotating weight at a varying location in accordance to an angle of the detachable jib, and configured to output a divided voltage of the resistance plate according to a contact location of the conductive rotating weight as a detected angle of the detachable jib for determining whether or not an overload detection condition occurs or to perform overload prevention control;

an acquisition part configured to acquire the angle of the detachable jib based on a feed length of the wire rope from the winch;

a determination part configured to determine that a failure occurs when a difference between the angle detected by the detachable detection part and the angle acquired by the acquisition part exceeds a predetermined tolerance; and a control part configured to issue a warning and stops the winch when the determination part determines that the failure occurs.

3. A working vehicle, comprising:

a boom provided on the working vehicle;

a detachable jib being detachably attached to the boom;

a winch where a wire rope being wound around and configured to raise and lower the detachable jib attached to the boom by using the wire rope;

a detachable detection part provided on the detachable jib, configured to detach from the boom together with the detachable jib, having a conductive rotating weight and an arc-like resistance plate contacting with the conductive rotating weight at a varying location in accordance to an angle of the detachable jib, and configured to output a divided voltage of the resistance plate according to a contact location of the rotating weight as a detected angle of the detachable jib for determining whether or not an overload detection condition occurs or to perform overload prevention control;

an acquisition part configured to acquire the angle of the detachable jib based on a feed length of the wire rope from the winch;

a determination part configured to determine that a failure occurs when a difference between the angle detected by the detachable detection part and the angle acquired by the acquisition part exceeds a predetermined tolerance; and a control part configured to issue a warning and stops the winch when the determination part determines that the failure occurs, wherein:

the control part stops the winch, when the determination part determines that the failure occurs and the angle detected by the detachable detection part is out of a predetermined angular range, and the control part, after the stop of the winch, does not employ the angle detected by the detachable detection part but employs the angle acquired by the acquisition part as the angle for determining whether or not the overload detection condition occurs or to perform overload prevention control.

4. The working vehicle according to claim 1, further comprising:

a connector having a wiring to connect between the detection part and the determination part.

5. The working vehicle according to claim 2, further comprising:

a connector having a wiring to connect between the detection part and the determination part.

6. The working vehicle according to claim 3, further comprising:

a connector having a wiring to connect between the detection part and the determination part.

7. The working vehicle according to claim 1, further comprising:

a control system of the working vehicle having the acquisition part and the determination part; and a connector having a wiring for connecting the detachable detection part to the control system, wherein the wiring of the connector is exposed when the detachable detection part is separated from the control system of the working vehicle.

8. The working vehicle according to claim 2, further comprising:

a control system of the working vehicle having the acquisition part, the determination part and the control part; and a connector having a wiring for connecting the detachable detection part to the control system, wherein the wiring of the connector is exposed when the detachable detection part is separated from the control system of the working vehicle.

9. The working vehicle according to claim 3, further comprising:

a control system of the working vehicle having the acquisition part, the determination part and the control part; and a connector having a wiring for connecting the detachable detection part to the control system, wherein the wiring of the connector is exposed when the detachable detection part is separated from the control system of the working vehicle.

* * * * *